(12) United States Patent
Murota

(10) Patent No.: US 9,684,181 B2
(45) Date of Patent: Jun. 20, 2017

(54) OPTICAL DEVICE AND PROJECTION VIDEO DISPLAY DEVICE

(71) Applicant: Panasonic Intellectual Property Management Co., Ltd., Osaka-shi, Osaka (JP)

(72) Inventor: Tomohiro Murota, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/853,353

(22) Filed: Sep. 14, 2015

(65) Prior Publication Data

US 2016/0085083 A1 Mar. 24, 2016

(30) Foreign Application Priority Data

Sep. 19, 2014 (JP) ................................ 2014-190989
Aug. 4, 2015 (JP) ................................ 2015-153872

(51) Int. Cl.
| G03B 21/20 | (2006.01) |
| G02B 5/02 | (2006.01) |
| G02B 27/48 | (2006.01) |
| H04N 9/31 | (2006.01) |
| G02B 26/08 | (2006.01) |

(52) U.S. Cl.
CPC ........... *G02B 27/48* (2013.01); *G02B 5/0294* (2013.01); *G02B 26/08* (2013.01); *H04N 9/3105* (2013.01); *H04N 9/315* (2013.01); *H04N 9/3161* (2013.01); *G03B 21/206* (2013.01)

(58) Field of Classification Search
None
See application file for complete search history.

(56) References Cited

U.S. PATENT DOCUMENTS

| 2010/0118278 A1 | 5/2010 | Kobayashi et al. | |
| 2011/0013149 A1* | 1/2011 | Utsunomiya | G02B 27/48 353/38 |
| 2012/0044557 A1 | 2/2012 | Isobe | |
| 2012/0140183 A1* | 6/2012 | Tanaka | G03B 21/28 353/20 |
| 2014/0043589 A1* | 2/2014 | Chifu | G03B 21/204 353/33 |
| 2014/0125956 A1* | 5/2014 | Chifu | G02B 27/48 353/31 |

FOREIGN PATENT DOCUMENTS

| JP | 2008-122823 | 5/2008 |
| JP | 2010-117533 | 5/2010 |
| JP | 2012-042742 | 3/2012 |

* cited by examiner

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

The optical device includes a diffuser which diffuses light, a holder which holds the diffuser, a driver which vibrates the holder, and a supporter whose one end elastically supports the holder at one point and whose other end is fixed to an installation plane.

2 Claims, 10 Drawing Sheets

OPTICAL DEVICE AND PROJECTION VIDEO DISPLAY DEVICE

BACKGROUND

1. Field of the Disclosure

The present disclosure relates to an optical device which reduces speckle noise of coherent light, and a projection video display device which includes this optical device.

2. Background Art

A projection video display device which causes a light source to emit coherent light (e.g. laser light) and projects and displays a video image produces a spot pattern which is called speckle noise in a display video image.

Unexamined Japanese Patent Publication No. 2008-122823 (Patent Literature 1) discloses a projector. This projector has a movable diffuser on an optical axis of laser light emitted from a light source. The diffuser is rotated or vibrated to reduce speckle noise.

Unexamined Japanese Patent Publication No. 2012-042742 (Patent Literature 2) discloses an optical device. This optical device includes an optical element through which laser light passes. Further, this optical element vibrates in a plane orthogonal to an optical path of laser light to reduce speckle noise.

SUMMARY

The present disclosure provides an optical device which can reduce speckle noise of coherent light, and a projection video display device which uses this optical device.

The optical device according to the present disclosure includes a diffuser which diffuses light, a holder which holds the diffuser, a driver which vibrates the holder, and a supporter whose one end elastically supports the holder at one point and whose other end is fixed to an installation plane.

The projection video display device according to the present disclosure includes a light source which emits coherent light, and the above-described optical device. Further, this optical device is disposed on an optical path of light emitted from the light source.

The optical device according to the present disclosure effectively reduces speckle noise while employing a relatively simple configuration.

DETAILED DESCRIPTION

Exemplary embodiments will be described optionally with reference to the drawings. In this regard, the exemplary embodiments will not be described more than necessary. For example, matters which have already been well known and substantially the same components will not be described in some cases. This is to prevent the following description from being redundant more than necessary, and to help one of ordinary skill in the art to easily understand the exemplary embodiments.

In addition, the accompanying drawings and the following description are provided to help one of ordinary skill in the art to sufficiently understand the present disclosure, and do not intend to limit a subject matter recited in the claims.

In addition, the same reference signs, symbols and numbers in the description will indicate the same components unless described in particular. Further, components which are not indispensable for the present disclosure will not be illustrated unless otherwise described in particular.

Furthermore, an example where each semiconductor laser included in a light source emits blue light B as coherent light will be described in the following embodiment. However, this coherent light may be light of other wavelengths.

First Exemplary Embodiment

The first exemplary embodiment will be described below with reference to FIGS. 1 to 6.

[1-1. Configuration of Projection Video Display Device]

Projection video display device 100 will be described with reference to FIGS. 1 and 2.

Figure 1:
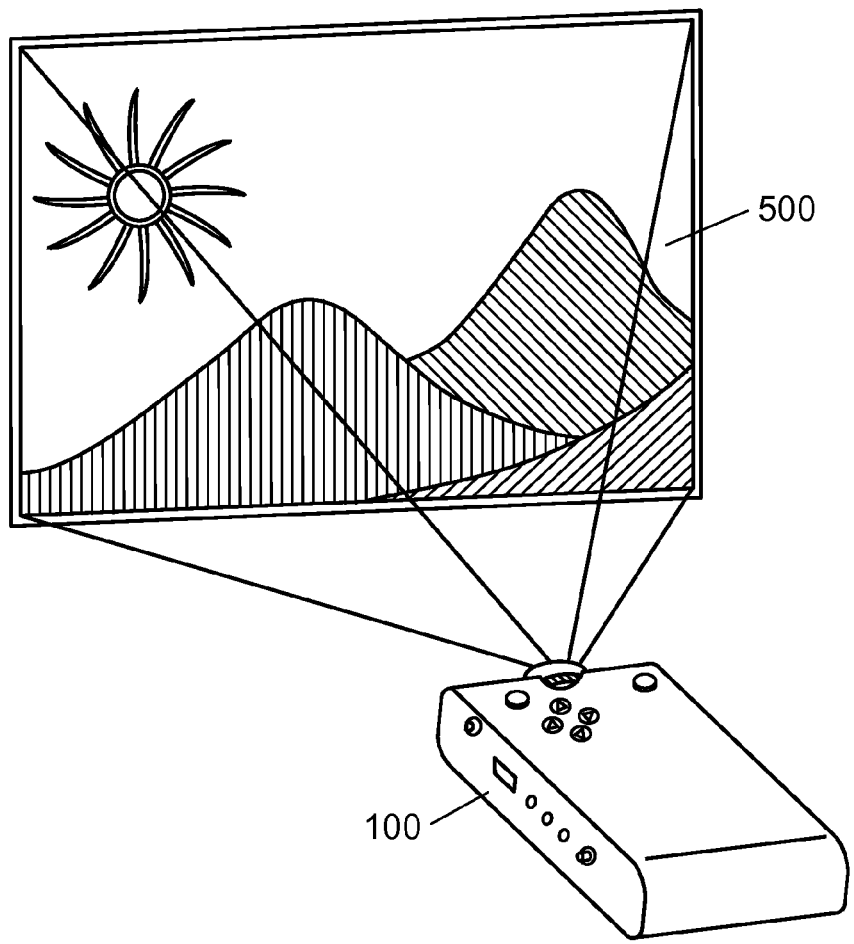
FIG. 1 is a perspective view schematically illustrating an example of an external appearance of a projection video display device which includes an optical device according to a first exemplary embodiment.

FIG. 1 is a perspective view schematically illustrating an example of an external appearance of projection video display device 100 which includes an optical device according to the first exemplary embodiment.

Projection video display device 100 projects, to screen 500, video light generated according to a video signal input from an outside. Projection video display device 100 is an example of a projection video display device.

Figure 2:
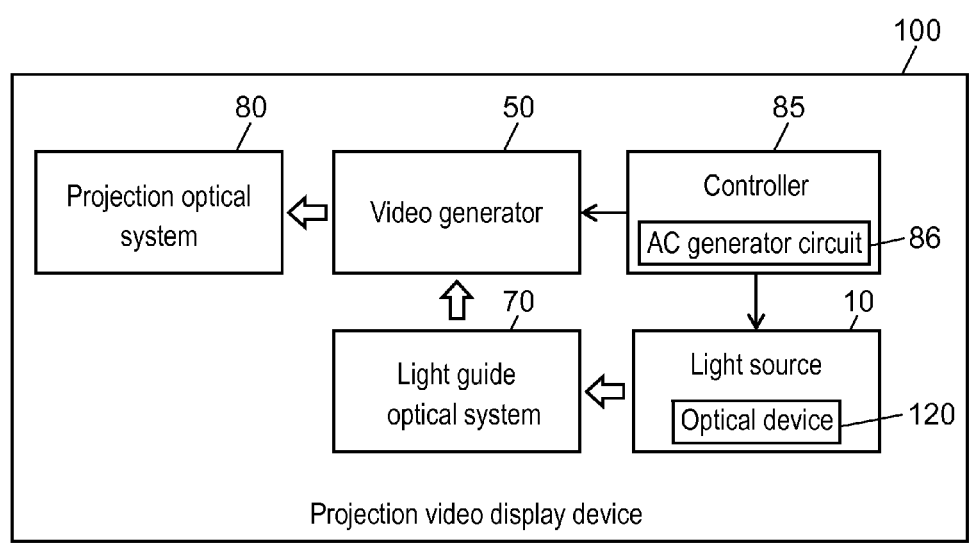
FIG. 2 is a block diagram schematically illustrating a configuration example of the projection video display device which includes the optical device according to the first exemplary embodiment.

FIG. 2 is a block diagram schematically illustrating one configuration example of projection video display device 100 which includes the optical device according to the first exemplary embodiment. In addition, FIG. 2 illustrates signal flows as solid arrows, and light flows as outlined arrows.

In addition, projection video display device 100 illustrated in FIG. 2 is an example of the projection video display device, and the projection video display device according to the present disclosure is by no means limited to the configuration illustrated in FIG. 2.

Projection video display device 100 includes light source 10, video generator 50, light guide optical system 70, projection optical system 80, and controller 85.

Controller 85 is configured to control entire projection video display device 100 including light source 10 and video generator 50. Further, controller 85 includes an alternating-current (AC) generator circuit 86 which generates electromagnetic force by applying an AC current to a coil described below. The AC generator circuit 86 is a general AC current generator circuit, and therefore will not be described in detail. In addition, controller 85 may be a microcomputer on which a program created to execute various types of control operates. Further, controller 85 and AC generator circuit 86 may be separate components.

Light source 10 includes a plurality of semiconductor lasers (semiconductor lasers 12 illustrated in FIG. 3), and optical device 120. Light source 10 causes each semiconductor laser to emit, as excitation light, laser light which enables a fluorescent material (not illustrated) to emit. Further, optical device 120 is configured to diffuse laser light emitted from each semiconductor laser. Optical device 120 will be described later in detail.

Light guide optical system 70 includes optical members (not illustrated) such as various lenses, mirrors, and a rod integrator. Further, light guide optical system 70 is configured to guide laser light emitted from light source 10 to video generator 50 by using these optical members.

Video generator 50 includes an element which spatially modulates light, such as a digital micromirror device (abbreviated as a DMD below) and a liquid crystal panel. Further, video generator 50 is configured to spatially modulate laser light emitted from light source 10 according to a video signal by using this element, and generate video light.

Projection optical system 80 includes optical members such as a lens and mirrors. Further, projection optical system 80 is configured to enlarge video light generated by video generator 50 and project the video light to screen 500 by using these optical members.

In addition, a configuration and an operation of each block included in projection video display device 100 are substantially the same as the configuration and the operation of projectors which are generally used except for optical device 120 included in light source 10, and therefore will not be described in detail.

Next, optical components of projection video display device 100 will be described.

[1-2. Optical Components of Projection Video Display Device]

Figure 3:
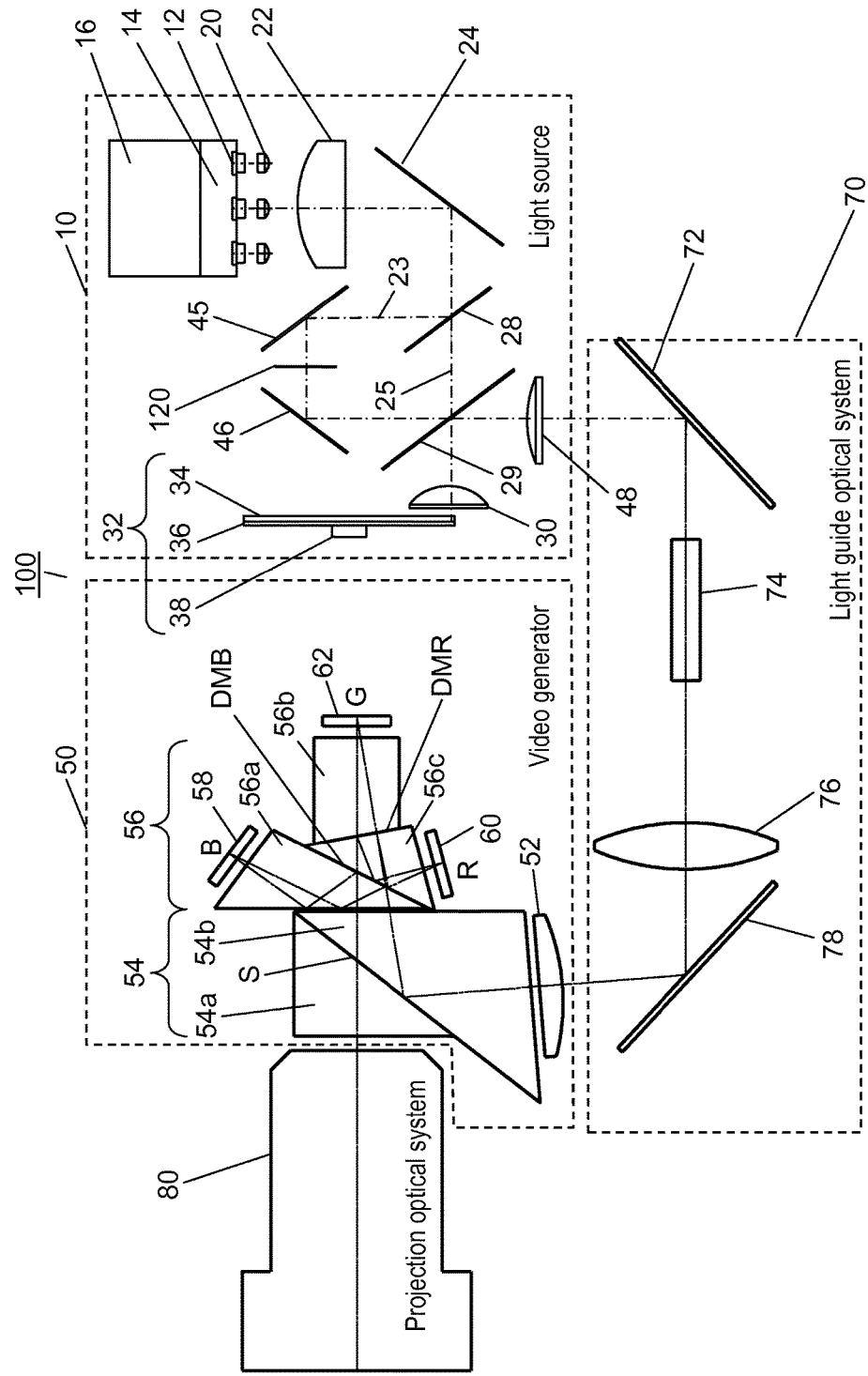
FIG. 3 is a view schematically illustrating an example of optical components of the projection video display device which includes the optical device according to the first exemplary embodiment.

FIG. 3 is a view schematically illustrating an example of the optical components of projection video display device 100 having optical device 120 according to the first exemplary embodiment. In addition, FIG. 3 illustrates an optical path with a dashed-dotted line. Further, a light traveling direction indicates the front in the following description.

Projection video display device 100 includes, as optical blocks, light source 10, video generator 50, light guide optical system 70, and projection optical system 80. Further, projection video display device 100 includes DMDs as elements which spatially modulate light. These elements may be, for example, liquid crystal panels.

Light source 10 includes a plurality of semiconductor lasers 12 which emit coherent light (blue light B), light source holder 14 on which the plurality of semiconductor lasers 12 are mounted, heatsink 16 which is disposed in a back surface of light source holder 14, a plurality of lenses 20 which are provided for respective semiconductor lasers 12, lens 22 which is disposed in front of lenses 20, mirrors 24, 45, and 46, first dichroic mirror 28, second dichroic mirror 29, fluorescent wheel 32, condenser lens 30, collecting lens 48, and optical device 120.

Each semiconductor laser 12 is an example of a light source, and is configured to emit P polarization component light (blue light B).

Blue light B having been emitted from each semiconductor laser 12 transmits through lens 20 disposed in front of each semiconductor laser 12, and then transmits through lens 22. Blue light B having been emitted from each semiconductor laser 12 is converted into parallel light when transmitting through each lens 20 and lens 22.

Blue light B having transmitted through lens 22 is reflected by mirror 24 and enters first dichroic mirror 28.

First dichroic mirror 28 is configured to reflect part of blue light B emitted from each semiconductor laser 12 at a predetermined ratio, and to allow the rest of blue light B to transmit. In this regard, light having been reflected by first dichroic mirror 28 is light of first optical path 23, and light having transmitted through first dichroic mirror 28 is light of second optical path 25. First dichroic mirror 28 is an example of a splitter which splits light from light source 10 into light of first optical path 23 and light of second optical path 25.

Thus, first dichroic mirror 28 splits blue light B into light of first optical path 23 and light of second optical path 25. The light of first optical path 23 is used as is as blue light B. Light of second optical path 25 is used by fluorescent wheel 32 to generate yellow light Ye (or mixed light of green light G and red light R). Note that yellow light Ye in the follow description is substantially equivalent to mixed light of green light G and red light R.

In the present exemplary embodiment, first dichroic mirror 28 is set to reflect 15% of blue light B and allow 85% of blue light B to transmit. However, these numerical values are exemplary values and may be other numerical values.

Blue light B having transmitted through first dichroic mirror 28 enters second dichroic mirror 29.

Second dichroic mirror 29 is configured to have one surface which allows blue light B to transmit (substantially totally transmit) and the other surface which reflects (substantially totally reflects) yellow light Ye. In this regard, the surface on which blue light B having transmitted through first dichroic mirror 28 enters is the one surface, and a back surface of the one surface is the other surface. Hence, blue light B having transmitted through first dichroic mirror 28 transmits through second dichroic mirror 29, too.

Note that each cutoff wavelength of first dichroic mirror 28 and second dichroic mirror 29 is set close to a wavelength of blue light B emitted from each semiconductor laser 12.

Blue light B having transmitted through first dichroic mirror 28 and second dichroic mirror 29 passes through condenser lens 30 and is directed to fluorescent wheel 32. Condenser lens 30 condenses this blue light B on a surface of fluorescent wheel 32.

Fluorescent wheel 32 includes aluminum board 36 and motor 38. On a surface of aluminum board 36 (a surface irradiated with blue light B), fluorescent layer 34 is formed. Fluorescent layer 34 is made of a fluorescent material which emits yellow light Ye by using blue light B as excitation light.

Blue light B having transmitted through condenser lens 30 is directed to fluorescent layer 34. Fluorescent layer 34 having been irradiated with blue light B emits yellow light Ye. This yellow light Ye is diffused inside fluorescent layer 34, so that speckle noise is reduced. Part of yellow light Ye emitted by fluorescent layer 34 is emitted in a direction of second dichroic mirror 29, and the other part of yellow light Ye is reflected by aluminum board 36 and is emitted in a direction of second dichroic mirror 29.

Condenser lens 30 condenses blue light B having transmitted through second dichroic mirror 29, on fluorescent layer 34 of fluorescent wheel 32, and converts yellow light Ye emitted from fluorescent layer 34 into parallel light.

Yellow light Ye having been emitted from fluorescent layer 34 of fluorescent wheel 32 is converted into parallel light by condenser lens 30, and enters the other surface of second dichroic mirror 29. Second dichroic mirror 29 reflects this yellow Ye in a direction of collecting lens 48.

Mirrors 45 and 46 are disposed such that blue light B reflected by first dichroic mirror 28 enters second dichroic mirror 29. Further, optical device 120 is disposed between mirrors 45 and 46.

Blue light B having been reflected by first dichroic mirror 28 is reflected by mirror 45, and enters optical device 120 disposed in front of mirror 45. Optical device 120 is disposed such that blue light B reflected by mirror 45 passes through the diffuser (diffuser 44 illustrated in FIG. 4) included in optical device 120. Hence, blue light B having been reflected by mirror 45 passes through the diffuser included in optical device 120.

The diffuser is configured to diffuse coherent light which passes through the diffuser. Further, optical device 120 is configured to vibrate the diffuser, and reduce speckle noise of coherent light which passes through the diffuser. Hence, when blue light B passes through vibrating diffuser 44, speckle noise is reduced. Optical device 120 will be described later in detail.

Blue light B having transmitted through the diffuser included in optical device 120 is reflected by mirror 46 and enters second dichroic mirror 29. As described above, second dichroic mirror 29 allows this blue light B to transmit.

Blue light B having transmitted through second dichroic mirror 29 travels in a direction of collecting lens 48. Hence, blue light B having transmitted through second dichroic mirror 29 and yellow light Ye having been reflected by second dichroic mirror 29 are mixed (synthesized) as white light W and enter collecting lens 48.

Thus, second dichroic mirror 29 synthesizes blue light B (light of first optical path 23) and yellow light Ye (light generated by using light of second optical path 25).

Light guide optical system 70 includes mirrors 72 and 78, rod integrator 74, and release lens 76.

White light W having been synthesized by second dichroic mirror 29 is condensed by collecting lens 48, reflected by mirror 72, and enters rod integrator 74. White light W incident on rod integrator 74 is reflected a plurality of times inside rod integrator 74, which makes a light intensity distribution substantially uniform. Further, white light W whose light intensity distribution has been made uniform is emitted from rod integrator 74.

White light W having been emitted from rod integrator 74 is condensed by release lens 76 and then is reflected by mirror 78.

Video generator 50 includes field lens 52, total reflection prism 54, color prism 56, and DMDs 58, 60 and 62.

White light W having been reflected by mirror 78 transmits through field lens 52, and enters total reflection prism 54.

Total reflection prism 54 includes two prisms 54*a* and 54*b*. In a surface in which prisms 54*a* and 54*b* are close to each other, a thin air layer is formed. The air layer substantially totally reflects light which enters at an angle equal to or more than a critical angle. This surface will be referred to as total reflection surface S. White light W having passed through field lens 52 and having entered total reflection prism 54 is reflected by total reflection surface S, is emitted from total reflection prism 54, and enters color prism 56.

Color prism 56 includes three prisms 56*a*, 56*b*, and 56*c*. In a surface in which prisms 56*a*, 56*b* and 56*c* are close to one another, dichroic mirror surface DMB which reflects blue light B and dichroic mirror surface DMR which reflects red light R are formed. Color prism 56 is set such that a cutoff wavelength of dichroic mirror surface DMR provides a predetermined light quantity ratio of red light R and green light G in a wavelength band of yellow light Ye generated by light source 10. This ratio is desirably set appropriately according to a specification of projection video display device 100.

White light W incident on color prism 56 is split into three beams of color light of blue light B, red light R, and green light G by dichroic mirror surface DMB and dichroic mirror surface DMR. Further, blue light B enters DMD 58, red light R enters DMD 60, and green light G enters DMD 62.

Each of DMDs 58, 60, and 62 includes a plurality of micromirrors (not illustrated) whose number corresponds to a number of pixels. By deflecting each micromirror according to video signals, each of DMDs 58, 60 and 62 modulates light which enters each of DMDs 58, 60, and 62 to light (video light) which enters projection optical system 80 and light (unnecessary light) which travels to an outside of an effective region of projection optical system 80. DMD 58 generates blue video light according to a blue video signal, DMD 60 generates red video light according to a red video signal, and DMD 62 generates green video light according to a green video signal.

The video light generated by each of DMDs 58, 60, and 62 transmits through color prism 56 again. In a process in which each video light passes through color prism 56, the blue video light, the red video light, and the green video light are mixed and synthesized with each other as display video light. Then, the synthesized display video light enters total reflection prism 54.

The video light incident on total reflection prism 54 enters total reflection surface S at a critical angle or less. Hence, this video light transmits through total reflection prism 54 and enters projection optical system 80.

Projection optical system 80 enlarges video light generated by video generator 50 and projects the video light to screen 500.

Thus, the video light based on the video signal is projected from projection video display device 100 to screen 500.

In the configuration example illustrated in FIG. 3, since light source 10 includes a plurality of solid state light sources (semiconductor lasers 12), projection video display device 100 can highly efficiently emit white light W of a good white balance. Consequently, in the configuration example illustrated in FIG. 3, it is possible to realize projection video display device 100 having a long operational life and high brightness.

Further, in the configuration example illustrated in FIG. 3, video generator 50 includes DMDs 58, 60, and 62 which are elements spatially modulating light. Consequently, in the configuration example illustrated in FIG. 3, compared to a projection video display device (not illustrated) which includes liquid crystal panels as elements which spatially modulate light, projection video display device 100 has a high resistance to light and heat. Further, in the configuration example illustrated in FIG. 3, video generator 50 includes three DMDs, that is, DMD 58 which generates blue video light, DMD 60 which generates red video light, and DMD 62 which generates green video light. Consequently, projection video display device 100 has good color reproducibility and can provide bright and high-definition video images to screen 500.

Next, optical device 120 according to the present exemplary embodiment will be described with reference to FIGS. 4 to 6.

[1-3. Detailed Configuration of Optical Device]

Figure 4:
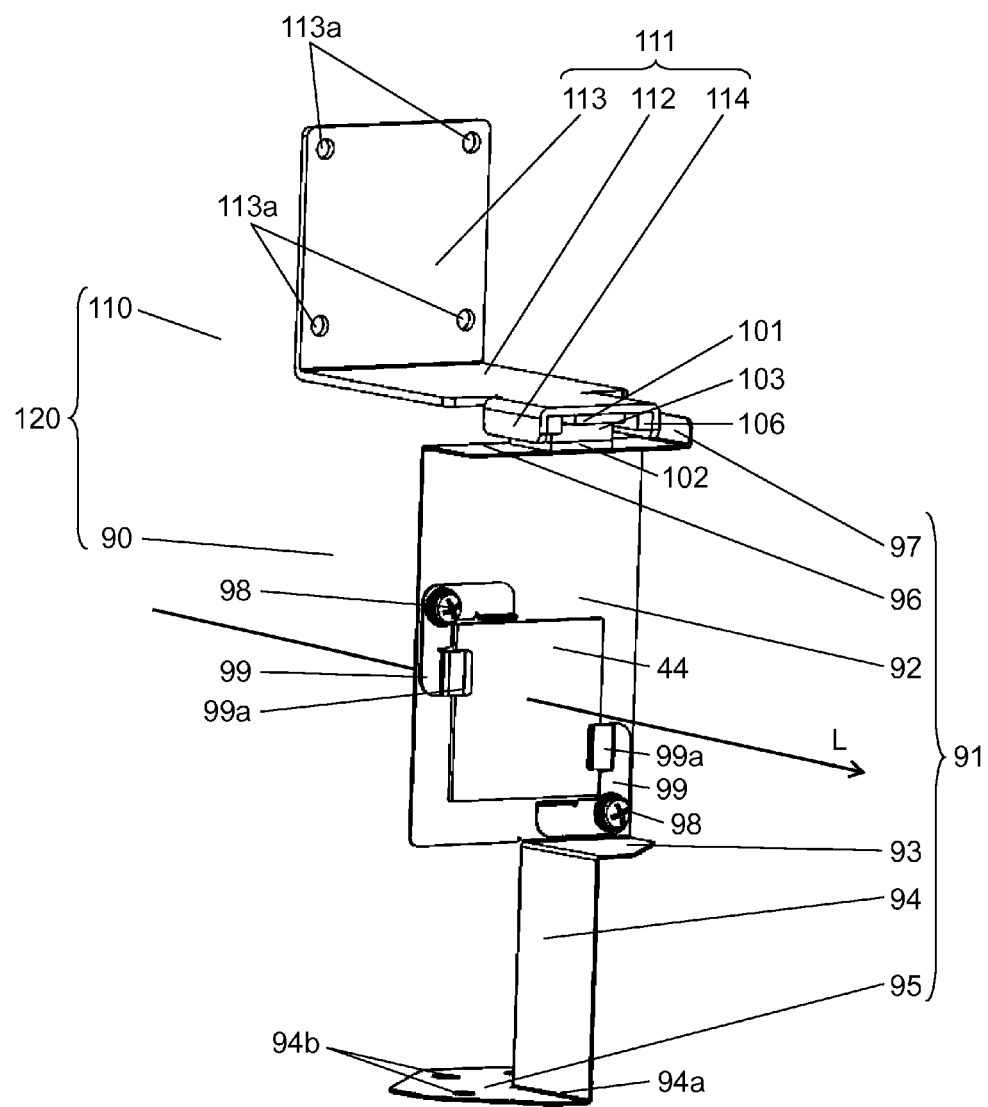
FIG. 4 is a perspective view illustrating an example of an external appearance of the optical device according to the first exemplary embodiment.

FIG. 4 is a perspective view illustrating an example of an external appearance of optical device 120 according to the first exemplary embodiment.

Figure 5:
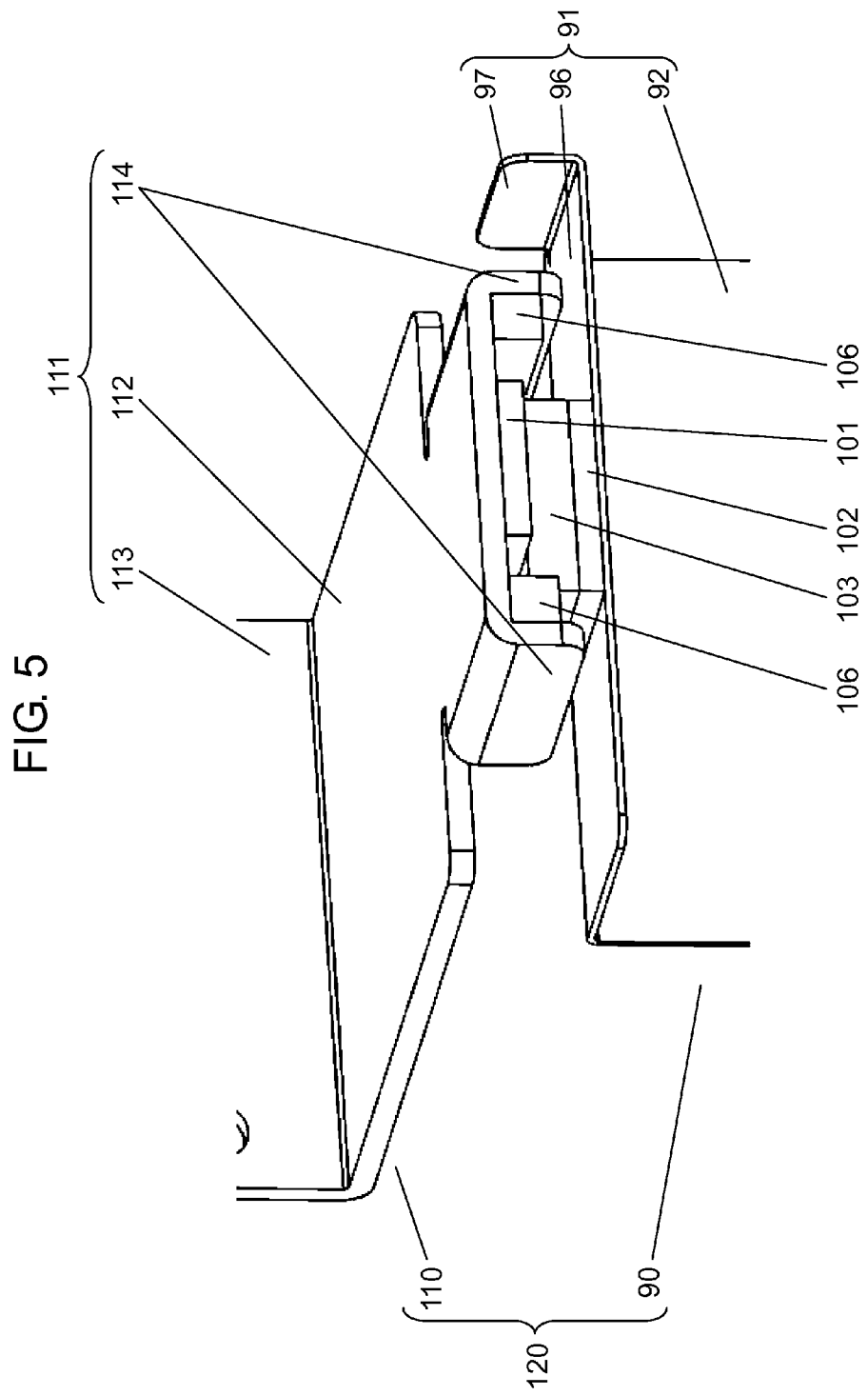
FIG. 5 is an enlarged perspective view illustrating a driver of the optical device according to the first exemplary embodiment.

FIG. 5 is an enlarged perspective view illustrating a driver of optical device 120 according to the first exemplary embodiment.

Figure 6:
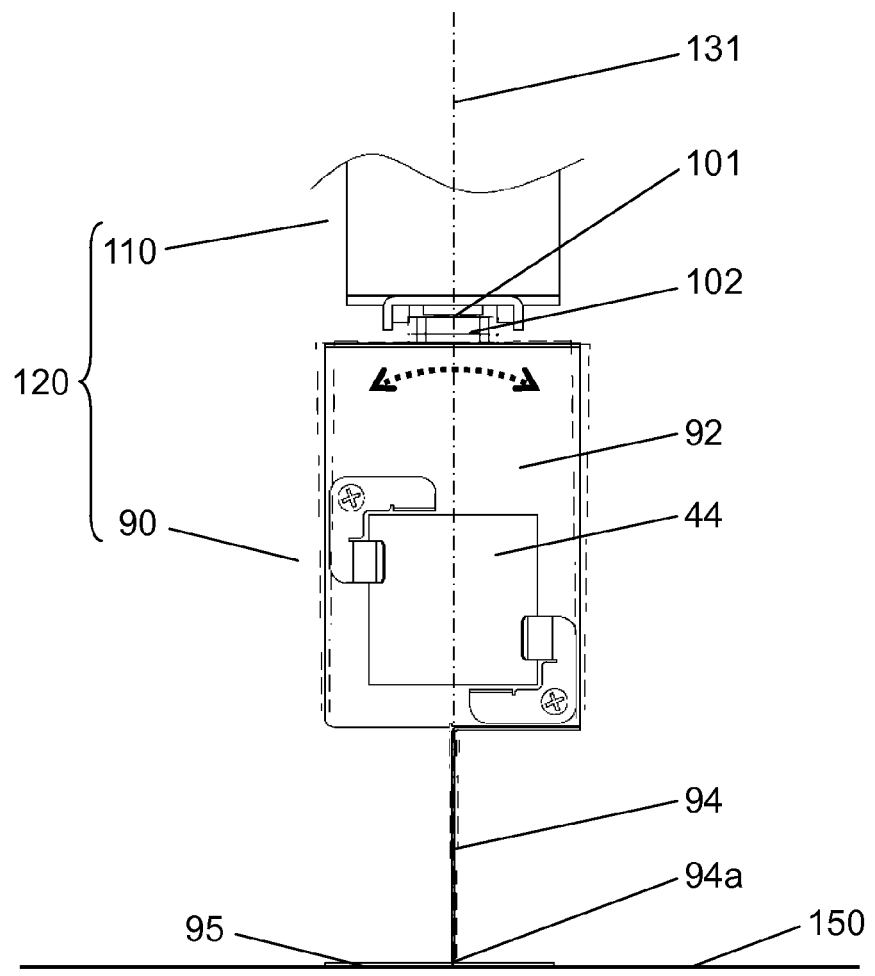
FIG. 6 is a view schematically illustrating the optical device which is operating according to the first exemplary embodiment.

FIG. 6 is a view schematically illustrating optical device 120 which is operating according to the first exemplary embodiment.

As illustrated in FIG. 4, optical device 120 includes fixing part 110 and movable part 90.

Fixing part 110 includes fixing part holder 111, coil 101, and buffers 106.

Movable part 90 includes movable part holder 91, diffuser 44, a pair of diffuser holders 99, magnet 102, and yoke 103.

Movable part holder 91 is formed of an elastic member. An example of this elastic member includes a spring material such as SUS304CSP, yet may include another material. Movable part holder 91 is formed by folding one spring material flat plate, for example. However, the present disclosure is by no means limited to this configuration. In movable part holder 91, at least supporter 94 needs to be formed of an elastic member. Further, movable part holder 91 may be formed by die-casting or welding.

Movable part holder 91 includes flat surface part 92, joint 93, supporter 94, base 95, magnet attachment 96, and measure 97.

Flat surface part 92 is configured to attach diffuser 44 thereto. Flat surface part 92 is opened in a region in which coherent light transmits through diffuser 44 attached to flat surface part 92 (not illustrated). Flat surface part 92 illustrated in FIG. 4 is formed into a rectangular shape, yet may be formed into another shape such as a circle. Flat surface part 92 has screw holes (not illustrated) for attaching a pair of diffuser holders 99 to flat surface part 92 by screws 98. Flat surface part 92 is an example of a holder which holds diffuser 44. Flat surface part 92 has a size of about 30 mm×30 mm, yet the present disclosure is by no means limited to this numerical value.

Diffuser holder 99 is a member which fixes diffuser 44 to flat surface part 92 to hold. Diffuser holder 99 is an example of the holder. Diffuser holder 99 includes holding claws 99*a* which hold diffuser 44. Further, a pair of diffuser holders 99 diagonally disposed in diffuser 44 are attached to flat surface part 92 by screws 98 with diffuser 44 interposed between holding claws 99*a* and flat surface part 92, so that diffuser 44 is fixed to flat surface part 92. Optical device 120 is configured such that diffuser 44 vibrates when flat surface part 92 vibrates, which will be described later. Hence, diffuser 44 is desirably fixed to flat surface part 92 firmly without rattling in any of a horizontal direction, a vertical direction, and an optical axis L direction during vibration. In addition, diffuser holders 99 are attached to flat surface part 92 by screws 98, so that diffuser 44 is detachable from flat surface part 92 and is exchangeable.

Diffuser 44 is an optical element which has a function of diffusing laser light (blue light B) emitted from each semiconductor laser 12. In the present exemplary embodiment, by disposing diffuser 44 at a position orthogonal to optical axis L of laser light and vibrating diffuser 44 in a direction orthogonal to optical axis L, it is possible to reduce speckle noise of the laser light. Diffuser 44 has a size of 10 mm×15 mm, for example. However, the present disclosure is by no means limited to this numerical value.

Joint 93 is a member which joints flat surface part 92 and supporter 94. As illustrated as an example in FIG. 4, joint 93 joints flat surface part 92 and supporter 94 such that a plane of flat surface part 92 and a plane of supporter 94 are orthogonal to each other.

Supporter 94 has one end which supports flat surface part 92 via joint 93, and other end 94*a* which is fixed to an installation plane by base 95. Supporter 94 is provided such that the plane of flat surface part 92 and the plane of supporter 94 are orthogonal to each other. Hence, optical device 120 is disposed such that flat surface part 92 is orthogonal to optical axis L. Consequently, supporter 94 formed of an elastic member can deflect in the direction orthogonal to optical axis L. That is, supporter 94 elastically supports flat surface part 92 to enable flat surface part 92 to vibrate in the direction orthogonal to optical axis L.

Further, supporter 94 supports flat surface part 92 substantially at one point at which the plane of flat surface part 92 and the plane of supporter 94 intersect with each other. Thus, flat surface part 92 supported by supporter 94 vibrates in the direction orthogonal to optical axis L and in an arc shape with other end 94*a* being as a center point.

In addition, supporter 94 is desirably disposed directly below a center of diffuser 44 or directly below a center of flat surface part 92. However, the present disclosure is by no means limited to this configuration. Further, supporter 94 has a size of about 10 mm×30 mm, for example. However, the present disclosure is by no means limited to this numerical value.

Base 95 is a member which fixes other end 94*a* of supporter 94 to the installation plane on which movable part 90 is disposed (e.g. a housing of projection video display device 100 which is not illustrated). Base 95 is fixed to the installation plane by, for example, being screwed to the installation plane by inserting screws (not illustrated) in screw holes 94*b* provided to base 95. Base 95 may be fixed to the installation plane by an adhesive.

Magnet attachment 96 is formed by bending the other end of flat surface part 92 (an end portion opposing to a side supported by supporter 94) at a predetermined width. This bending angle is about 90 degrees, yet may be another angle. At a position of magnet attachment 96 directly above supporter 94, magnet 102 is attached. That is, a predetermined width in magnet attachment 96 is a width which allows this magnet 102 to be attached. In addition, magnet 102 may be directly attached to the end portion of flat surface part 92 without bending the end portion of flat surface part 92. Here, an extension direction of supporter 94 will be referred to as a top, and an installation plane side at which base 95 is disposed will be referred to as a bottom.

Magnet 102 is a permanent magnet which is generally used, and is attached to yoke 103. Yoke 103 may have a shape which is stacked on magnet 102 or may have a shape which covers magnet 102. Yoke 103 is made of a material of little impurities such as iron or steel, and absorption power of magnet 102 increases by combining magnet 102 and yoke 103.

Measure 97 is formed by bending one end of a longitudinal direction side of magnet attachment 96 toward a side at which magnet 102 is disposed (in a direction in which fixing part holder 111 is disposed) at a predetermined width.

This bending angle is about 90 degrees yet may be another angle. Measure 97 is formed to measure a vibration range and a vibration frequency of vibrating movable part holder 91, and can measure the vibration range and the vibration frequency of vibrating movable part holder 91 by irradiating measure 97 with laser light from a laser displacement sensor (not illustrated). That is, a predetermined width and a bending angle of measure 97 are a width and an angle which enable this measurement.

Fixing part holder 111 is made of a non-magnetic material, such as aluminum alloy and polycarbonate, which does not affect magnet 102. Fixing part holder 111 includes flat part 112, attachment 113, and bent part 114. Fixing part holder 111 is disposed at the other end side of flat surface part 92 and at a higher position than movable part holder 91.

Attachment 113 is provided to fix fixing part holder 111 to the installation plane (e.g. the housing of projection video display device 100 which is not illustrated). Attachment 113 is fixed to the installation plane by, for example, being screwed to the installation plane by inserting screws (not illustrated) to screw holes 113a provided to attachment 113. Attachment 113 may be fixed to the installation plane by, for example, an adhesive.

Flat part 112 is formed at an appropriate angle with respect to attachment 113 such that flat part 112 and magnet attachment 96 are parallel to each other, coil 101 does not contact yoke 103, and electromagnetic force generated by coil 101 appropriately works on magnet 102.

Bent part 114 and buffers 106 are examples of limiters. Bent part 114 is provided to limit a deflection amount of supporter 94 to prevent supporter 94 from excessively deflecting. Bent part 114 is formed by bending portions (two portions) of flat part 112 toward a magnet attachment 96 at about 90 degrees such that a pair of buffers 106 are attached at positions opposing to a vibration direction of magnet 102 (front and rear positions in the vibration direction of magnet 102). Further, bent part 114 is formed such that static magnet 102 (or yoke 103 attached to magnet 102) is disposed at a substantially center position of bent part 114.

Each buffer 106 is made of an elastic material. This elastic material may be elastomer such as silicon rubber or may be a coil spring. A pair of buffers 106 are attached to positions of bent portion 114 opposing to the vibration direction of magnet 102 (front and rear positions in the vibration direction of magnet 102). Magnet 102 (or yoke 103 attached to magnet 102) collides against buffers 106, so that the vibration range is limited. Since buffers 106 are made of an elastic material, a collision sound at this time is reduced.

In addition, bent part 114 and buffers 106 are provided to limit a deflection amount of supporter 94 and prevent supporter 94 from being damaged or deteriorating. When, for example, projection video display device 100 including optical device 120 is carried and when projection video display device 100 greatly swings or swings for a long period of time, if optical device 120 has neither bent part 114 nor buffers 106, this swing excessively deflects supporter 94 and supporter 94 is likely to be further damaged or deteriorated. However, bent part 114 and buffers 106 limit a deflection amount of supporter 94, so that it is possible to prevent a damage and deterioration.

Coil 101 is attached to the substantially center position of bent part 114 (i.e. a position corresponding to magnet 102 or yoke 103 of static movable part holder 91).

Coil 101 and magnet 102 are examples of drivers which vibrate flat surface part 92. Coil 101 is electrically connected to AC generator circuit 86, and generates electromagnetic force in the surroundings of coil 101 by applying an AC current generated by AC generator circuit 86 to coil 101. By applying the AC current from AC generator circuit 86 to coil 101, it is possible to vibrate magnet 102 and vibrate flat surface part 92 through magnet 102. In addition, a frequency of the AC current generated by AC generator circuit 86 is 40 Hz to 60 Hz inclusive, for example. However, the present disclosure is by no means limited to this value.

FIG. 6 schematically illustrates this vibration. As illustrated in FIG. 6, base 95 of movable part holder 91 is fixed to installation plane 150. When the electromagnetic force generated in coil 101 works on magnet 102 and magnet 102 vibrates, magnet attachment 96 to which magnet 102 is attached vibrates in the same direction as the direction of magnet 102.

As a result, supporter 94 deflects around other end 94a of supporter 94, and, as indicated by a double-headed arrow of a broken line in FIG. 6, flat surface part 92 vibrates in an arc shape with vertical line 131 being a center line and other end 94a being a center point. In addition, vertical line 131 is a virtual line which passes on a center of static supporter 94 (a center in a thickness direction) and is substantially vertical to installation plane 150.

The vibration range and the vibration frequency for vibrating magnet 102 can be arbitrarily set by controlling a frequency and a current amount of an AC current applied to coil 101. The vibration range and vibration frequency are desirably set appropriately such that an effect of interest (i.e. an effect of reducing speckle noise in a display video image) is obtained according to a light diffusion degree of diffuser 44.

The vibration range of diffuser 44 at a position at which laser light passes is smaller than a vibration range of magnet 102. This is because movable part holder 91 vibrates in an arc shape with other end 94a of supporter 94 being as the center point. Consequently, the vibration range of magnet 102 is desirably set appropriately based on a ratio of a distance from other end 94a to magnet 102 to a distance from other end 94a to a position of diffuser 44 through which laser light passes, such that the vibration range of diffuser 44 at a position at which laser light passes becomes a desired vibration range. In the present exemplary embodiment, the vibration range of diffuser 44 at a position at which laser light passes is 0.1 mm to 0.2 mm inclusive, for example. However, the present disclosure is by no means limited to this value.

A speckle noise reduction effect of optical device 120 depends on the light diffusion degree in diffuser 44. The speckle noise reduction effect of optical device 120 is greater when the light diffusion degree of diffuser 44 is higher, and is smaller when the light diffusion degree in diffuser 44 is lower.

Further, in a case where the vibration range of vibrating diffuser 44 is fixed, the speckle noise reduction effect of optical device 120 is greater when the vibration frequency is higher, and the speckle noise reduction effect is smaller when the vibration frequency is lower. Furthermore, in a case where the vibration frequency of vibrating diffuser 44 is fixed, a speckle noise reduction effect of optical device 120 is greater when the vibration range is great and the speckle noise reduction effect is smaller when the vibration range is smaller.

[1-4. Effect and Others]

As described above, in the present exemplary embodiment, the optical device includes a diffuser which diffuses light, a holder which holds the diffuser, a driver which vibrates the holder, and a supporter whose one end elastically supports the holder at one point and whose other end is fixed to an installation plane.

In this optical device, the driver may vibrate the holder at a side confronting a side elastically supported by the supporter.

In this optical device, the driver may include a coil and a magnet.

This optical device may include a limiter which limits a range of the vibration.

In this optical device, the holder may detachably hold the diffuser.

Further, in the present exemplary embodiment, a projection video display device includes a light source which emits coherent light, and the above optical device. Further, this optical device is disposed on an optical path of light emitted from the light source.

In this projection video display device, the diffuser of the optical device may be disposed at a position orthogonal to an optical axis of the light, and the driver may vibrate the diffuser in a direction orthogonal to the optical axis of the light.

This projector video display device may include a splitter which splits the light emitted from the light source into a first optical path and a second optical path, and the optical device may be disposed on one of the first optical path and the second optical path.

In addition, in the present disclosure, optical device 120 is an example of an optical device. Diffuser 44 is an example of the diffuser. Flat surface part 92 and diffuser holder 99 are examples of the holders. Coil 101 and magnet 102 are examples of the drivers. Supporter 94 is an example of the supporter. Bent part 114 and buffers 106 are examples of the limiters. Projection video display device 100 is an example of the projection video display device. Each semiconductor laser 12 is an example of a light source. Further, laser light emitted from each semiconductor laser 12 is an example of coherent light. First optical path 23 is an example of the first optical path, and second optical path 25 is an example of the second optical path. Further, first optical path 23 is an example of the optical path on which the optical device is disposed. First dichroic mirror 28 is an example of the splitter.

Thus, the optical device according to the present exemplary embodiment can reduce speckle noise with a simple configuration compared to a conventional technique of rotating a diffuser or a conventional technique of holding an optical element which is a diffuser by a plurality of leaf springs.

For example, it is demanded that a projection video display device which is likely to be used outdoor is miniaturized to improve convenience to carry or install the projection video display device. The optical device according to the present exemplary embodiment can reduce speckle noise of coherent light with a relatively simple configuration. Consequently, the optical device according to the present exemplary embodiment is useful to miniaturize the highly efficient projection video display device which can reduce speckle noise.

Further, the optical device according to the present exemplary embodiment can use elasticity of the supporter to vibrate the holder (e.g. flat surface part 92) and, consequently, reduce necessary power for vibrating the holder (e.g. power consumed by coil 101).

Furthermore, the projection video display device including the optical device is likely to be damaged or deteriorate when the supporter formed of an elastic member excessively deflects due to vibration caused in transportation. The projection video display device which is used outdoors is frequently carried and therefore is more likely to face such a problem. However, the limiter limits the deflection amount of the supporter, so that the optical device according to the present exemplary embodiment can prevent such a damage or deterioration. Consequently, the optical device according to the present exemplary embodiment is useful for the projection video display device which is frequently carried.

Further, the optical device according to the present exemplary embodiment can arbitrarily set a vibration range and a vibration frequency of the diffuser by controlling the AC current applied to coil 101. Furthermore, the holder detachably holds the diffuser, so that it is possible to optionally exchange the diffuser. Consequently, the projection video display device according to the present exemplary embodiment can arbitrarily set a speckle noise reduction effect of the optical device by, for example, adjusting a speckle noise reduction effect while observing the display video image.

Further, in a case where the vibration frequency set to the optical device is substantially equal to a number of unique vibrations of the projection video display device, when optical device 120 is driven, projection video display device 100 is likely to vibrate/resonate. However, the optical device according to the present exemplary embodiment can easily set the vibration frequency other than the number of unique vibrations of projection video display device 100, and can prevent projection video display device 100 from vibrating/resonating.

Further, in the example illustrated in FIG. 4, magnet attachment 96, joint 93, and supporter 94 of movable part holder 91 are formed at one lateral surface side of flat surface part 92 of movable part holder 91. The present disclosure by no means limits the structure of movable part holder 91 to the structure illustrated in FIG. 4. However, in a case where movable part holder 91 adopts the structure illustrated in FIG. 4, when optical device 120 is disposed in projection video display device 100, it is possible to dispose, for example, other parts in a space at the other lateral surface side of flat surface part 92 of movable part holder 91, which effectively uses a space around optical device 120.

In addition, as illustrated in the example in FIG. 4, when flat surface part 92 and supporter 94 are jointed by joint 93, joint 93 and flat surface part 92 are jointed at a plurality of portions or in a continuous region, and the joint and the supporter are jointed at a plurality of portions or in a continuous region in some cases. However, in the present exemplary embodiment, as illustrated in an example in FIG. 6, when the holder and the supporter are connected (or jointed) such that the holder (e.g. flat surface part 92) vibrates in an arc shape with the end portion (e.g. other end 94a) of the supporter fixed to the installation plane as the center point, the supporter elastically supports the holder at one point.

Second Exemplary Embodiment

Light source 10 of projection video display device 100 according to the first exemplary embodiment causes optical device 120 to reduce speckle noise of light passing through first optical path 23, and reduce speckle noise of light passing through second optical path 25 by diffusing light generated inside fluorescent layer 34 of fluorescent wheel 32.

However, the present disclosure is by no means limited to this configuration. For example, speckle noise of light passing through second optical path 25 may be reduced by using an optical device configured similar to optical device 120. This configuration will be described in the second exemplary embodiment.

The second exemplary embodiment will be described below with reference to FIGS. 7 and 8.

An external appearance and a block configuration of projection video display device 200 according to the second exemplary embodiment are substantially the same as the external appearance and the block configuration of projection video display device 100 according to the first exemplary embodiment, and therefore overlapping description will be omitted.

[2-1. Optical Components of Projection Video Display Device]

Figure 7:
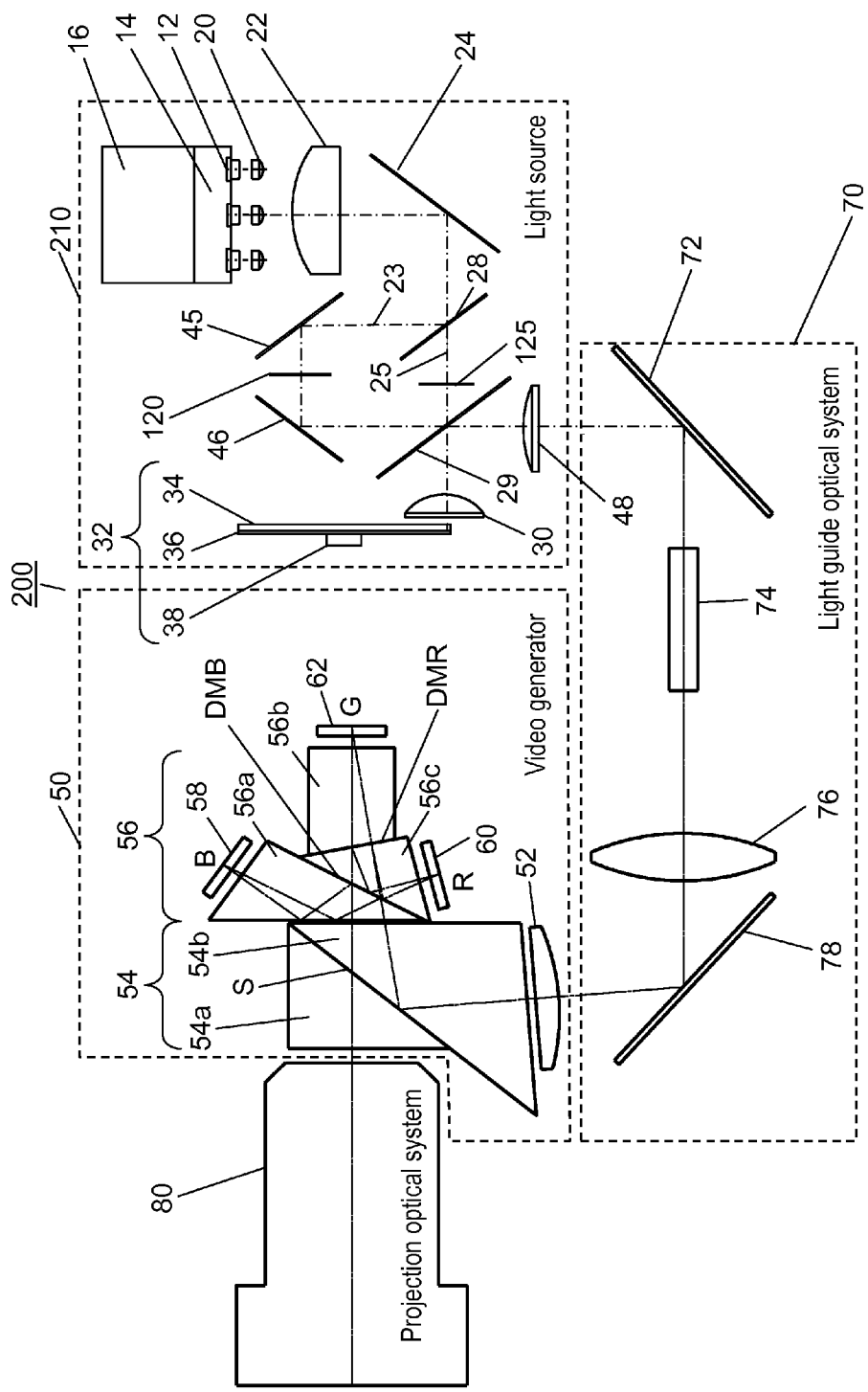
FIG. 7 is a view schematically illustrating an example of optical components of a projection video display device according to a second exemplary embodiment.

FIG. 7 is a view schematically illustrating an example of optical components of projection video display device 200 according to the second exemplary embodiment.

Note that components having the same configurations and performing the same operations as the configurations and the operations of projection video display device 100 according to the first exemplary embodiment will be assigned the same reference numerals as those in the first exemplary embodiment, and therefore overlapping description will be omitted.

Projection video display device 200 includes, as optical blocks, light source 210, video generator 50, light guide optical system 70, and projection optical system 80.

Light source 210 included in projection video display device 200 includes optical device 120 disposed between mirrors 45 and 46 on first optical path 23 and, in addition, optical device 125 having the same configuration as the configuration of optical device 120 between first dichroic mirror 28 and second dichroic mirror 29 on second optical path 25. Optical device 125 reduces speckle noise of light having transmitted through first dichroic mirror 28.

Accordingly, light source 210 according to the present exemplary embodiment reduces speckle noise by causing optical device 125 to diffuse light passing through second optical path 25 and by diffusing the light inside fluorescent layer 34 of fluorescent wheel 32.

Except for this point, light source 210 is substantially the same as light source 10 described in the first exemplary embodiment, and therefore detail description will be omitted.

Next, optical device 125 according to the present exemplary embodiment will be described with reference to FIG. 8.

[2-2. Detailed Configuration of Optical Device]

Figure 8:
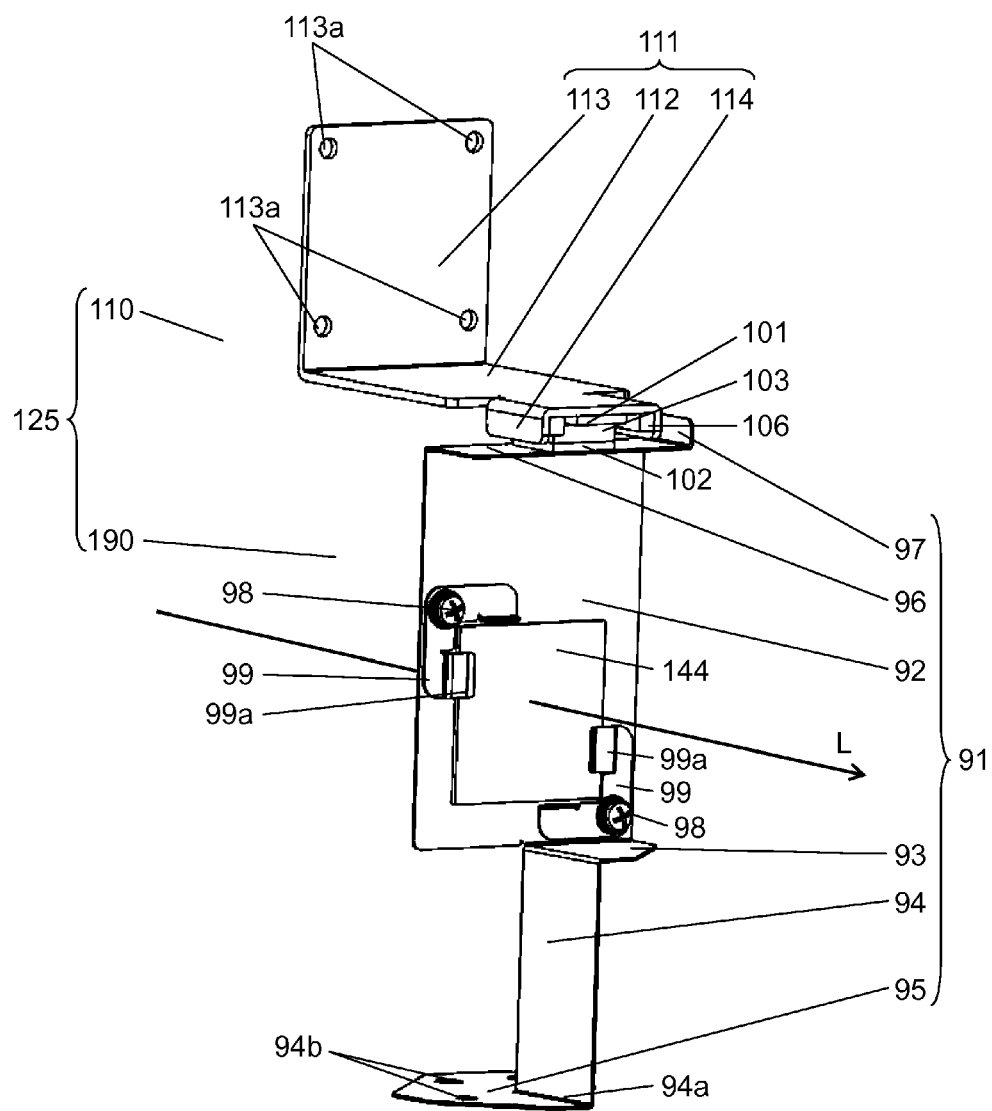
FIG. 8 is a perspective view illustrating an example of an external appearance of the optical device according to the second exemplary embodiment.

FIG. 8 is a perspective view illustrating an example of an external appearance of optical device 125 according to the second exemplary embodiment. Note that components having the same configurations and performing the same operations as the configurations and the operations of optical device 120 according to the first exemplary embodiment will be assigned the same reference numerals as those in the first exemplary embodiment, and overlapping description will be omitted.

As illustrated in FIG. 8, optical device 125 includes fixing part 110 and movable part 190.

Movable part 190 includes movable part holder 91, diffuser 144, a pair of diffuser holders 99, magnet 102, and yoke 103.

Optical device 125 according to the second exemplary embodiment has substantially the same configuration and performs substantially the same operation as the configuration and the operation of optical device 120 according to the first exemplary embodiment, and therefore detail description will be omitted.

Note that optical device 125 is configured to make a reduction degree of speckle noise of light passing through optical device 125 smaller than a reduction degree of speckle noise of light passing through optical device 120.

Specifically, a speckle noise reduction amount of optical device 125 is set such that a speckle noise reduction amount obtained by summing a speckle noise reduction amount obtained when light passes through vibrating diffuser 144 of optical device 125, and a speckle noise reduction amount obtained when light generated inside fluorescent layer 34 of fluorescent wheel 32 is diffused is equivalent to a speckle noise reduction amount obtained when light passes through vibrating diffuser 44 of optical device 120.

In order to realize the above setting, a diffuser whose light diffusion degree is lower than the light diffusion degree of diffuser 44 of optical device 120 may be used as diffuser 144 in optical device 125. Alternatively, diffuser 144 may be vibrated at a frequency lower than a vibration frequency of diffuser 44 of optical device 120. Alternatively, diffuser 144 may be vibrated at a vibration range smaller than a vibration range of diffuser 44 of optical device 120. Alternatively, these settings may be combined to configure optical device 125.

[2-3. Effect and Others]

As described above, according to the present exemplary embodiment, the projection video display device includes a light source which emits coherent light, and an optical device disposed on an optical path of light emitted from the light source. Further, this optical device includes a diffuser which diffuses light, a holder which holds the diffuser, a driver which vibrates the holder, and a supporter whose one end elastically supports the holder at one end and whose other end is fixed to an installation plane.

This projection video display device may include a splitter which splits light emitted from the light source into a first optical path and a second optical path, and the optical device may be disposed on both of the first optical path and the second optical path.

In addition, in the present disclosure, projection video display device 200 is an example of the projection video display device. Each of optical devices 120 and 125 is an example of the optical device. Each of diffusers 44 and 144 is an example of the diffuser. Flat surface part 92 and diffuser holder 99 are examples of the holders. Coil 101 and magnet 102 are examples of the drivers. Supporter 94 is an example of the supporter. Each semiconductor laser 12 is an example of the light source. Further, laser light emitted from each semiconductor laser 12 is an example of coherent light. First optical path 23 is an example of the first optical path, and second optical path 25 is an example of the second optical path. First dichroic mirror 28 is an example of the splitter.

The projection video display device according to the present exemplary embodiment reduces speckle noise of light incident on fluorescent wheel 32 by optical device 125. Consequently, it is possible to further reduce speckle noise of a video image generated by light emission of fluorescent layer 34.

In addition, appropriately diffusing light to be directed to a fluorescent material prevents a temperature of the fluorescent material from rising and improves light emission efficiency of the fluorescent material. On the other hand, when light directed to the fluorescent material is diffused too much, it is likely that efficiency to condense light emitted from the fluorescent material lowers and light emission brightness eventually lowers. In the present exemplary embodiment, light incident on fluorescent wheel 32 is diffused by diffuser 144 of optical device 125, and the diffusion degree of diffuser 144 is lower than the light diffusion degree of diffuser 44 of optical device 120. Hence, it is possible to improve light efficiency of fluorescent layer 34. Alternatively, the light diffusion degree of diffuser 144 of optical device 125 may be set to improve the light emission efficiency of fluorescent layer 34.

Third Exemplary Embodiment

Light source 210 of projection video display device 200 according to the second exemplary embodiment causes optical device 120 to reduce speckle noise of light passing through first optical path 23, and causes optical device 125 to reduce speckle noise of light passing through second optical path 25.

However, the present disclosure is by no means limited to this configuration. Speckle noise of each of light passing through first optical path 23 and light passing through second optical path 25 may be reduced by using one optical device having the same configuration as the configuration of optical device 120. This configuration will be described in the third exemplary embodiment.

The third exemplary embodiment will be described below with reference to FIGS. 9 and 10.

Note that an external appearance and a block configuration of projection video display device 300 according to the third exemplary embodiment are substantially the same as the external appearance and the block configuration of projection video display device 100 according to the first exemplary embodiment, and therefore overlapping description will be omitted.

[3-1. Optical Components of Projection Video Display Device]

Figure 9:
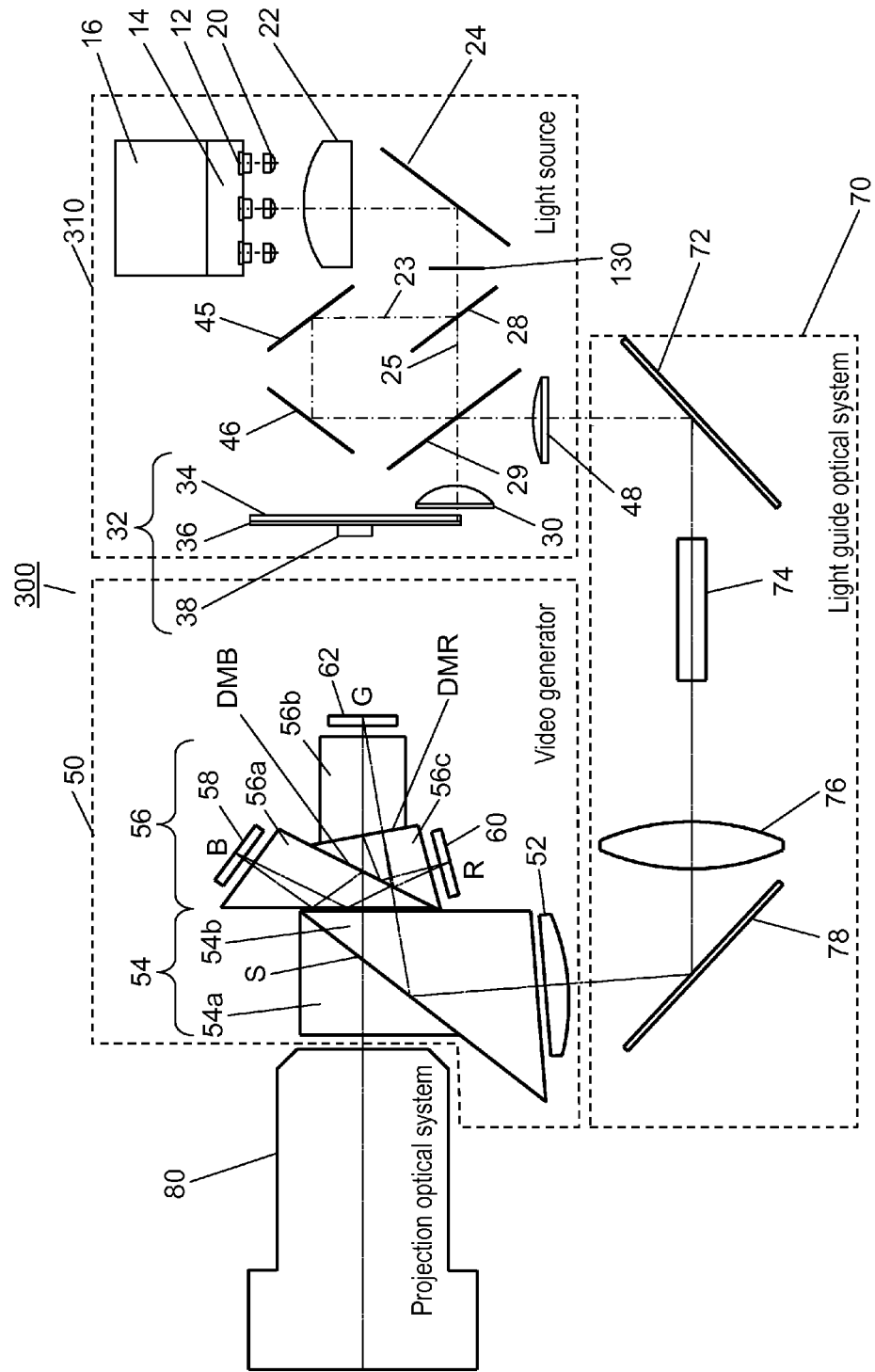
FIG. 9 is a view schematically illustrating an example of optical components of a projection video display device which includes an optical device according to a third exemplary embodiment.

FIG. 9 is a view schematically illustrating an example of optical components of projection video display device 300 according to the third exemplary embodiment.

Note that components having the same configurations and performing operations as the configurations and the operations of projection video display device 100 according to the first exemplary embodiment will be assigned the same reference numerals as the components of the first exemplary embodiment, and overlapping description will be omitted.

Projection video display device 300 includes, as optical blocks, light source 310, video generator 50, light guide optical system 70, and projection optical system 80.

Light source 310 included in projection video display device 300 differs from light source 10 according to the first exemplary embodiment in that light source 310 includes optical device 130 having the same configuration as the configuration of optical device 120 between mirror 24 and first dichroic mirror 28 without disposing optical device 120 between mirrors 45 and 46. Optical device 130 reduces speckle noise of light reflected by mirror 24.

Consequently, in light source 310 according to the present exemplary embodiment, light whose speckle noise has been reduced by optical device 130 enters first dichroic mirror 28. Thus, both speckle noise of light reflected by first dichroic mirror 28 and passing through first optical path 23 and speckle noise of light transmitting through first dichroic mirror 28 and passing through second optical path 25 are reduced by optical device 130.

Except for this point, light source 310 is substantially the same as light source 10 according to the first exemplary embodiment, and therefore detail description will be omitted.

In the third exemplary embodiment, an arrangement position of optical device 130 is by no means limited to an arrangement position illustrated in FIG. 9. In light source 310, optical device 130 needs to be disposed on one of optical paths which light emitted from each semiconductor laser 12 takes until the light enters first dichroic mirror 28.

Next, optical device 130 according to the present exemplary embodiment will be described with reference to FIG. 10.

[3-2. Detailed Configuration of Optical Device]

Figure 10:
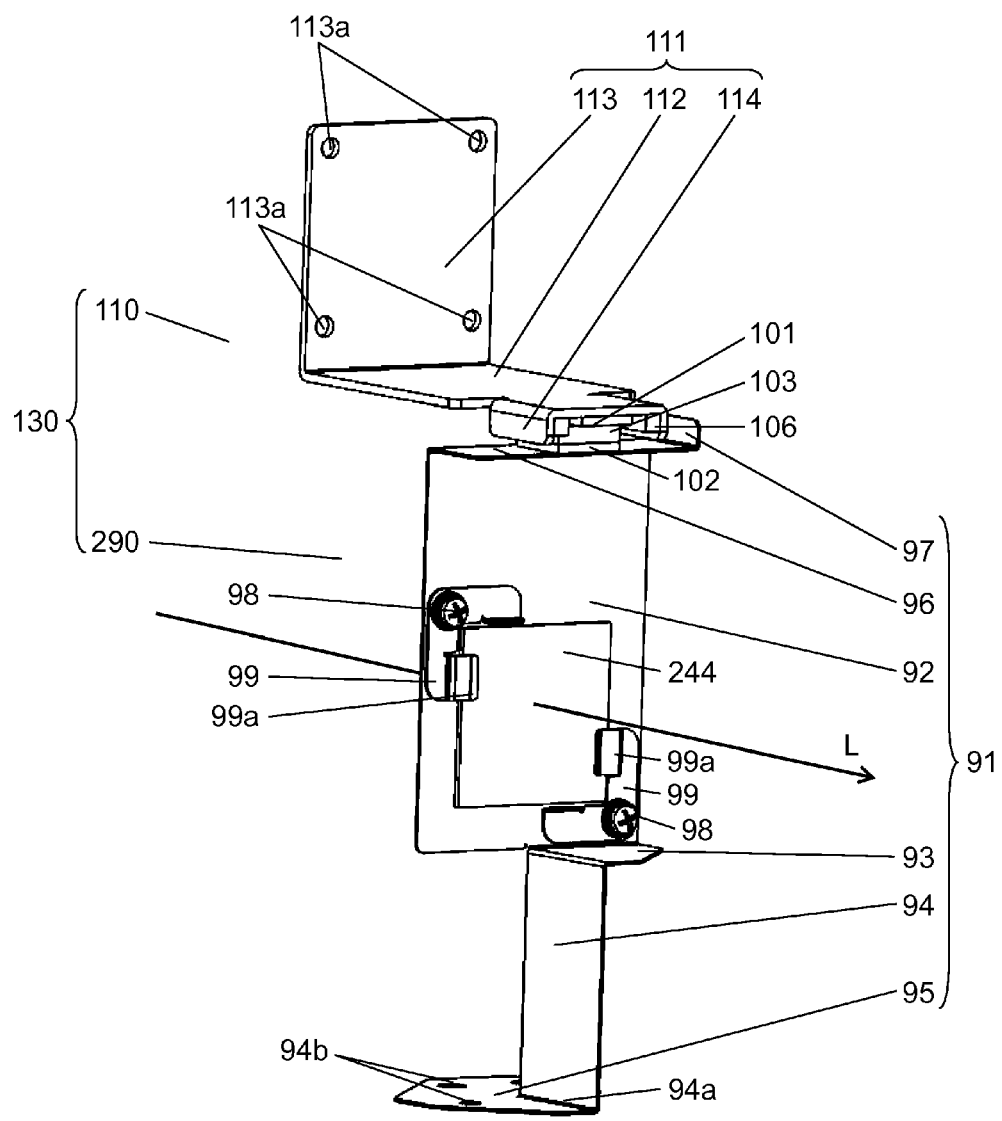
FIG. 10 is a perspective view illustrating an example of an external appearance of the optical device according to the third exemplary embodiment.

FIG. 10 is a perspective view illustrating an example of an external appearance of optical device 130 according to the third exemplary embodiment. Note that components having the same configurations and performing the same operations as the configurations and the operations of optical device 120 according to the first exemplary embodiment will be assigned the same reference numerals as those in the first exemplary embodiment, and therefore overlapping description will be omitted.

As illustrated in FIG. 10, optical device 130 includes fixing part 110 and movable part 290.

Movable part 290 includes movable part holder 91, diffuser 244, a pair of diffuser holders 99, magnet 102, and yoke 103.

Optical device 130 according to the third exemplary embodiment has substantially the same configuration and performs substantially the same operation as the configuration and the operation of optical device 120 according to the first exemplary embodiment, and therefore detail description will be omitted.

Optical device 130 may be the same as optical device 120 according to the first exemplary embodiment. Alternatively, a light diffusion degree of diffuser 244 may be different from a light diffusion degree of diffuser 44 according to the first exemplary embodiment. Alternatively, a vibration range for vibrating diffuser 244 may be different from a vibration range for vibrating diffuser 44 according to the first exemplary embodiment. Alternatively, a vibration frequency for vibrating diffuser 244 may be different from a vibration frequency for vibrating diffuser 44 according to the first exemplary embodiment. A light diffusion degree of optical device 130 is desirably set appropriately according to a specification of projection video display device 300 and a visual check experiment of a display video image.

[3-3. Effect and Others]

As described above, according to the present exemplary embodiment, the projection video display device includes a light source which emits coherent light, and an optical device disposed on an optical path of light emitted from the light source. Further, this optical device includes a diffuser which diffuses light, a holder which holds the diffuser, a driver which vibrates the holder, and a supporter whose one end elastically supports the holder at one end and whose other end is fixed to an installation plane.

This projection video display device may include a splitter which splits light emitted from the light source into a first optical path and a second optical path, and the optical device may be disposed on an optical path where the light does not yet enter the splitter.

In the present disclosure, projection video display device 300 is an example of the projection video display device. Optical device 130 is an example of the optical device. Diffuser 244 is an example of the diffuser. Flat surface part 92 and diffuser holder 99 are examples of the holders. Coil 101 and magnet 102 are examples of the drivers. Supporter 94 is an example of the supporter. Each semiconductor laser 12 is an example of the light source. Further, laser light emitted from each semiconductor laser 12 is an example of coherent light. First optical path 23 is an example of the first optical path, and second optical path 25 is an example of the second optical path. First dichroic mirror 28 is an example of the splitter.

According to the projection video display device according to the present exemplary embodiment, one optical device can reduce speckle noise of light passing through first optical path 23 and speckle noise of light passing through second optical path 25. Consequently, it is possible to simplify the configuration of the projector video display device compared to the configuration of the projection video display device which includes two optical devices.

Other Exemplary Embodiments

As described, the first to third exemplary embodiments have been described as exemplary techniques disclosed in this application. However, the technique according to the present disclosure is not limited to these and is applicable to exemplary embodiments for which changes, replacement, addition, and omission are carried out. Further, new exemplary embodiments can also be provided by combining each component described in the first to third exemplary embodiments.

Hereinafter, another exemplary embodiment will be described below.

A configuration example where fixing part holder 111 is disposed above movable part holder 91 has been described in the first to third exemplary embodiments. However, the present disclosure is by no means limited to this configuration. For example, fixing part holder 111 may be disposed below movable part holder 91. Alternatively, movable part holder 91 and fixing part holder 111 may be mutually disposed in the horizontal direction. The present disclosure by no means limits relative arrangement positions of movable part holder 91 and fixing part holder 111. Movable part holder 91 and fixing part holder 111 need to be disposed at positions at which coil 101 can vibrate magnet 102.

A projection video image display device which includes three DMDs in video generator 50 has been described in the first to third exemplary embodiments. However, the present disclosure is by no means limited to this configuration. For example, a configuration where one DMD is included in the video generator may be employed. Alternatively, a configuration including a liquid crystal panel instead of a DMD may be employed.

A configuration example where semiconductor lasers 12 which emit laser light as coherent light are provided to the light source has been described in the first to third exemplary embodiments. However, the present disclosure is by no means limited to this configuration. For example, a configuration including a light source such as a sodium lamp which emits coherent light may be employed.

A configuration example where the diffuser is disposed orthogonally to an optical axis of light emitted from the light source has been described in the first to third exemplary embodiments. However, the present disclosure is by no means limited to this configuration. For example, the diffuser may be inclined to the optical axis of light emitted from the light source as long as an effect of interest (an effect of reducing speckle noise of coherent light) can be obtained.

A configuration example where movable part holder 91 is fixed at one point has been described in the first to third exemplary embodiments. However, the present disclosure is by no means limited to this configuration. For example, movable part holder 91 may be fixed at two or more points.

In the first to third exemplary embodiments, an optical path of light which is not used to excite the fluorescent material is the first optical path and an optical path of light which is directed to the fluorescent material is the second optical path. However, the optical path of light which is not used to excite the fluorescent material may be the second optical path, and the optical path of light which is directed to the fluorescent material may be the first optical path.

A configuration where flat surface part 92 and supporter 94 are jointed by joint 93 has been described in the first exemplary embodiment. However, the present disclosure is by no means limited to this configuration. For example, supporter 94 and flat surface part 92 may be directly connected without providing joint 93.

A configuration where flat surface part 92 elastically supported by supporter 94 holds diffuser 44 has been described in the first exemplary embodiment. However, the present disclosure is by no means limited to this configuration. For example, a configuration where supporter 94 directly supports diffuser 44 at one point while flat surface part 92 is not provided may be employed. Further, magnet 102 may be directly attached to diffuser 44.

The present disclosure is applicable to the projection video display device which includes light sources which emit coherent light such as laser light. Specifically, the present disclosure is applicable to a liquid crystal projector or a DLP (Digital Light Processing) projector.

What is claimed is:

1. A projection video display device comprising:
   a light source that emits coherent light;
   a splitter that splits the light emitted from the light source into a first optical path and a second optical path; and
   an optical device disposed on one of the first optical path and the second optical path, the optical device comprising:
   a diffuser that diffuses light,
   a holder that holds the diffuser,
   a driver that vibrates the holder, and
   a supporter whose one end elastically supports the holder at one point and whose other end is fixed to an installation plane.

2. A projection video display device comprising:
   a light source that emits coherent light;
   a splitter that splits the light emitted from the light source into a first optical path and a second optical path; and
   an optical device disposed on both of the first optical path and the second optical path, the optical device comprising:
   a diffuser that diffuses light,
   a holder that holds the diffuser,
   a driver that vibrates the holder, and
   a supporter whose one end elastically supports the holder at one point and whose other end is fixed to an installation plane.

* * * * *